United States Patent [19]
Pantin et al.

[11] 4,205,934
[45] Jun. 3, 1980

[54] STACKING APPARATUS

[75] Inventors: John H. Pantin; Allan J. Hartley, both of Epping, England

[73] Assignee: The British Mathews Limited, Epping, England

[21] Appl. No.: 906,578

[22] Filed: May 16, 1978

[30] Foreign Application Priority Data

May 17, 1977 [GB] United Kingdom .............. 20727/77
May 17, 1977 [GB] United Kingdom .............. 20728/77

[51] Int. Cl.² .............................................. B65G 57/06
[52] U.S. Cl. ...................................... 414/77; 414/84; 414/120
[58] Field of Search .................... 414/71, 76, 77, 84, 414/87, 88, 120, 121, 122

[56] References Cited

U.S. PATENT DOCUMENTS

| Re. 24,124 | 2/1956 | Pierce ..................................... 414/88 |
| 2,875,908 | 3/1959 | Woodcock ............................. 414/84 |
| 3,342,349 | 9/1967 | Sheldon et al. .................. 414/120 X |
| 3,393,812 | 7/1968 | Mayo et al. ............................ 414/84 |
| 3,534,872 | 10/1970 | Roth et al. ....................... 198/443 X |

Primary Examiner—L. J. Paperner
Attorney, Agent, or Firm—Bertram Frank

[57] ABSTRACT

Apparatus for stacking layers of loads, e.g. on a pallet, comprises a stacking carriage and a transfer carriage each independently movable vertically on a main frame, so that the transfer carriage can receive each layer of loads at a low level and raise the layer to the level of the stacking carriage, the layer being then transferred to a stripping apron on the stacking carriage and deposited onto the stack of loads. The apparatus can be modified to act as a de-stacker for removing layers of loads successively from a stack, or to enable the apparatus to be operated selectively as a stacker or de-stacker.

11 Claims, 6 Drawing Figures

STACKING APPARATUS

This invention relates to apparatus for stacking or de-stacking layers of loads. Such apparatus can, for example, take the form of a palletiser for stacking layers of loads onto a pallet, or a de-palletiser for removing loads stacked in layers on a pallet, or of a machine which can operate selectively as a palletiser or de-palletiser.

With palletisers known hitherto, it has been usual for the loads to be supplied to a stripping apron at a level higher than the maximum height of loads on a full pallet. This necessitates the use of additional equipment to raise the loads to the correct level and to form the loads into the required stacking pattern at that level, and usually involves the provision of an operator's platform at the level of the stripping apron.

Depalletisers known hitherto have usually included a mechanism for removing the uppermost layer of loads from the pallet, the pallet being mounted on a lift unit which raises the pallet after each layer has been removed to enable the next layer to be removed. This has the disadvantage that the loads are removed at a high level and that an elevated platform is required for the operator of the equipment.

According to this invention there is provided apparatus for stacking layers of loads, comprising a main frame, a stacking carriage and a transfer carriage each independently vertically movable on the main frame, the stacking carriage including a horizontally movable apron onto which a layer of loads can be transferred from the transfer carriage and which can be withdrawn from beneath the layer to deposit it at a loading position beneath the stacking carriage or onto a previously deposited layer of loads, first drive means for effecting vertical movement of the stacking carriage whereby the carriage can be raised after depositing one layer of loads to a position in which the apron can be returned to receive a further layer of loads, second drive means for effecting vertical movement of the transfer carriage whereby the transfer carriage can be raised from a lowered position in which a layer of loads can be loaded onto the transfer carriage to the level of the stacking carriage, and means for transferring a layer of loads from the transfer carriage to the stacking carriage.

With the apparatus of the invention, the loads can be supplied to the apparatus and formed into the required stacking pattern at a low level, e.g. at a height of say 3 feet from floor level, and the whole operation can be observed from floor level, so that the need for an expensive elevated platform for the operator is obviated. Since the stacking carriage and transfer carriage can move independently the transfer carriage can be lowered to fetch the next layer of loads immediately after the previous layer has been transferred to the stacking carriage and whilst the stacking carriage is depositing that layer, so that the overall speed of operation of the apparatus can be increased.

The apparatus can be in the form of a palletiser, there being provided means for moving a pallet to the loading position to receive the first layer of loads deposited by the stacking carriage, and means for discharging a loaded pallet from the apparatus.

Preferably, the apron of the stacking carriage comprises a flexible platform supported between a pair of driven endless chains spaced apart by a distance greater than the width of the layers to be stacked and having a horizontal run in which the platform is horizontal and can support a layer of loads transferred from the transfer carriage, and a vertical stripper plate is fixed to the stacking carriage immediately above the said horizontal run so as to engage a layer of loads on the platform and hold the layer stationary as the chains are driven to withdraw the platform from beneath the layer, the chains and platform being arranged so that when the platform has been completely withdrawn from the layer it occupies a position which does not impede the depositing of the layer onto the layer or pallet beneath. The platform may for example comprise a series of parallel slats supported between the chains.

The stacking apparatus of the invention may be modified so that it can be operated selectively as a stacking apparatus or a de-stacking apparatus, such as a de-palletiser. This can be done by providing on the stacking carriage gripping means adapted to grip the uppermost layer of loads in a stack so that the layer can be separated from the layer beneath or from a pallet; the separated layer can then be transferred to the transfer carriage and lowered on that carriage to a position in which the layer can be discharged from the apparatus.

The invention also includes apparatus designed solely for de-stacking. Accordingly, the invention includes apparatus for removing layers of loads from a stack, for example of loads stacked in layers on the pallet, the appratus comprising a main frame, a load-supporting carriage and a transfer carriage each independently vertically movable on the main frame, the load-supporting carriage having gripping means adapted to grip the uppermost layer of loads in the stack so that the layer can be separated vertically from the layer beneath or from a pallet, means for transferring a layer of loads thus gripped to the transfer carriage, first drive means for effecting vertical movement of the load-supporting carriage whereby the carriage can be lowered after one layer of loads has been transferred to the transfer carriage to enable the next layer of loads to be gripped, and second drive means for effecting vertical movement of the transfer carriage whereby the transfer carriage can be raised to a position to receive a layer of loads gripped by the load-supporting carriage and subsequently lowered to a position at which the layer of loads can be discharged from the transfer carriage.

The de-stacker of the invention has the advantage that the loads can be discharged from the apparatus, e.g. to a discharge conveyor or unscrambling table, at a low level. Since the load-supporting carriage and transfer carriage can move independently, the load-supporting carriage can begin to move to grip the next layer as soon as a layer of loads has been transferred to the transfer carriage and whilst the transfer carriage is moving to the discharge position, so that the overall speed of operation of the de-palletiser can be increased.

Preferably, the means for transferring each layer of loads from the load-supporting carriage to the transfer carriage comprises a flexible platform mounted on the load-supporting carriage and supported between a pair of driven endless chains spaced apart by a distance greater than the overall width of the layers to be removed and having a horizontal run in which the platform is horizontal and positioned beneath the gripping means so that it can support the layer of loads on release of the gripping means, and means for driving the chains to cause the platform to be moved beneath a layer of loads gripped by the gripping means and separated vertically from the layer beneath or from a pallet and to move further after the layer has been released by the gripping means to transfer the layer to the transfer carriage.

The invention will now be described, by way of example, with reference to the accompanying drawings, in which.

Referring to the drawings, the palletiser comprises a main frame including a pair of hollow rectangular cross-section steel columns 10, on which moves a stacking carriage 14, and a pair of similar columns 12, on which moves a transfer carriage 16.

The stacking carriage 14 consists of a sub-frame 17 positioned between the two columns 10 and having at each side two vertically spaced pairs of wheels 18 each freely rotatable on roller bearings. The wheels of each pair run on either side of a vertical guide strip 20 fixed to the adjacent column 10, so that the carriage is vertically movable relative to the columns.

Vertical movement of the stacking carriage 14 is effected by means of a hydraulic lift motor 22 mounted on the main frame near the top of columns 10 and driving a lift chain 24 one end of which is fixed to the carriage and the other end of which carries a counterweight 26.

The stacking carriage 14 includes a stripping apron in the form of a platform 28 consisting of a series of parallel slats supported between a pair of endless chains 30. The chains have an upper horizontal run 32 extending from front to rear of the carriage and a return run 34 beneath the upper run, both runs being guided in channels 35 fixed to the carriage. The chains are driven by means of a hydraulic drive motor 36 mounted on the carriage and driving sprockets 38 over which the chains are trained at the rear of the carriage.

Figure 2:
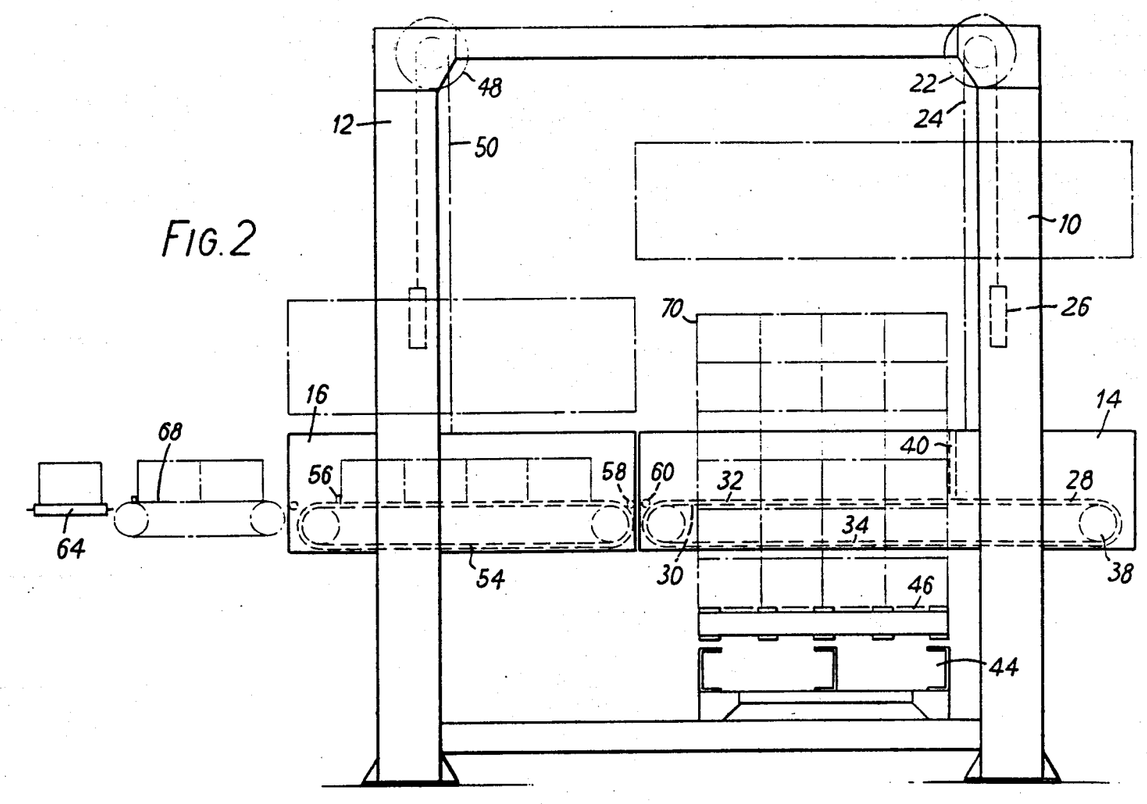
FIG. 2 is a diagrammatic side elevation of the palletiser of FIG. 1 showing the positions of a load infeed conveyor and assembly table.
Figure 3:
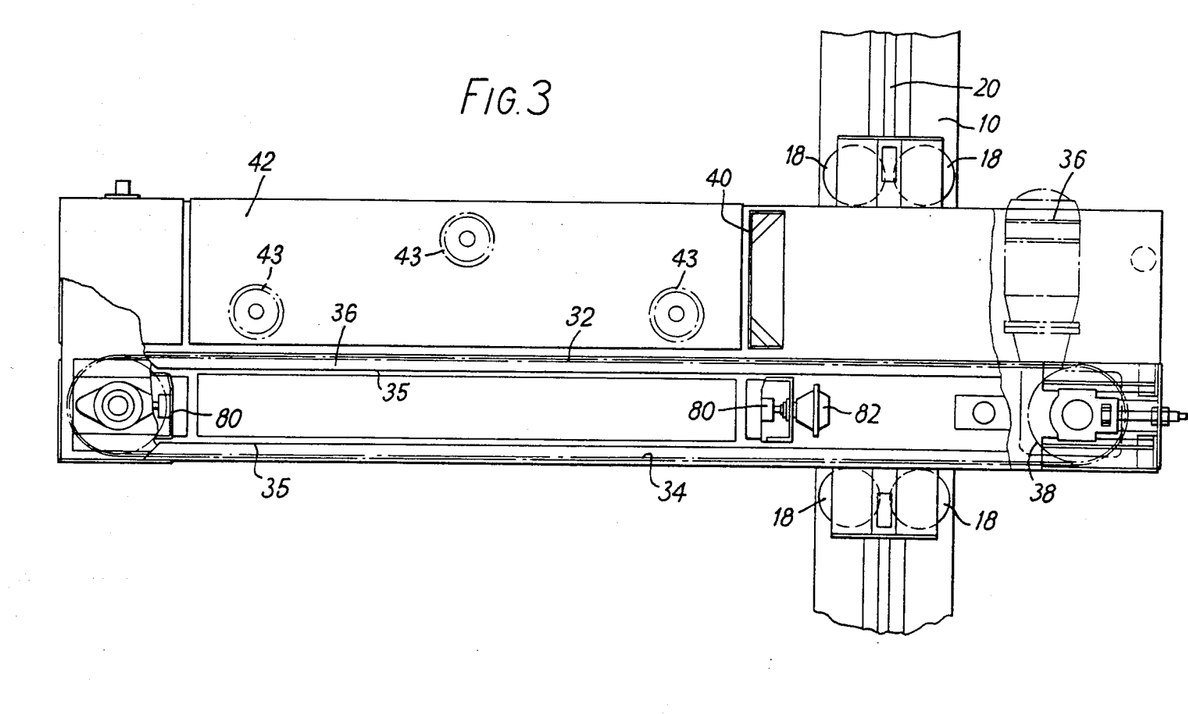
FIG. 3 is a side elevation of the stacking carriage of the palletiser.

A vertical stripper plate 40 is fixed to the stacking carriage 14 and extends across the width of the carriage so that it can engage one side of a layer of loads supported on the stripping apron 28 when the apron is located in the upper horizontal run 32 of chains 30. The chains 30 extend rearwards beyond the stripper plate 40 by a sufficient distance to allow the apron 28 to take up a stored position (as shown in FIG. 2) in which the whole of the apron 28 is to the rear of the plate 40 so that it does not impede the depositing of a layer of loads onto a pallet or the subsequent upward movement of the stacking carriage, as described below.

Figures 4, 5:
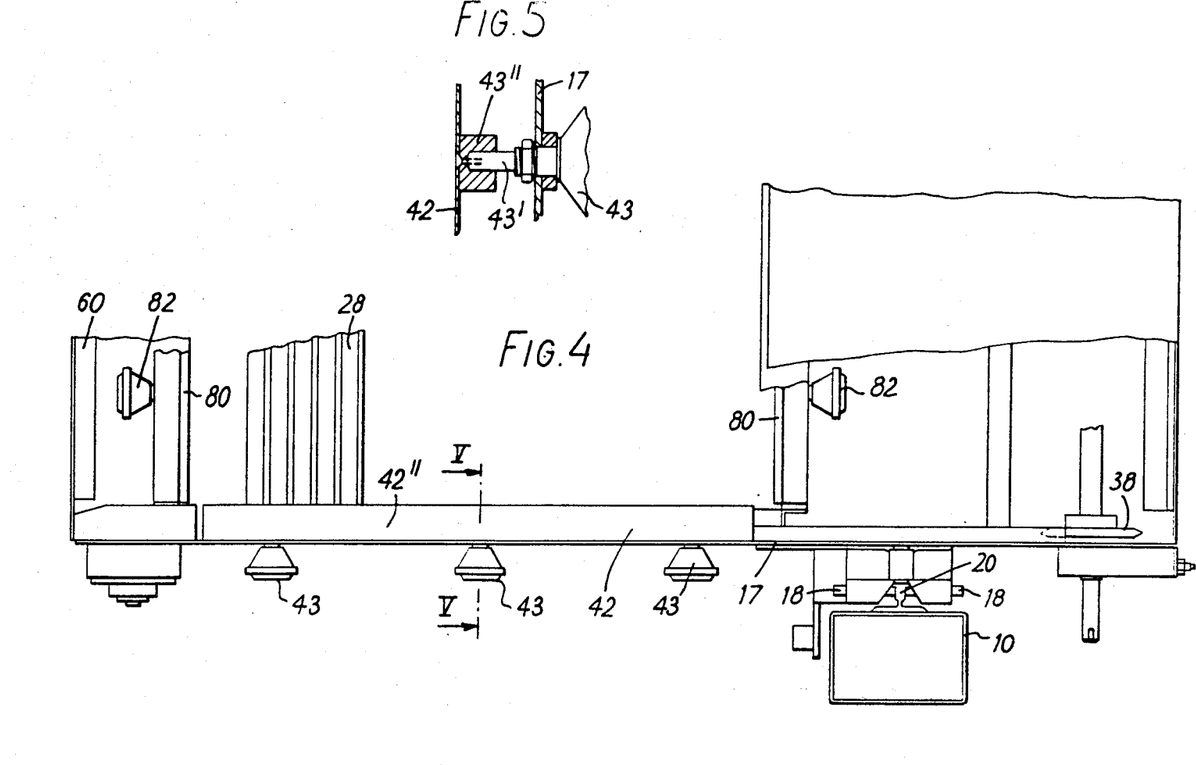
FIG. 4 is a fragmentary plan view of the stacking carriage of FIG. 3.
FIG. 5 is a section on line V—V of FIG. 4.

A pair of side guides 42 extend along the two sides of the stacking carriage to maintain the loads in position in a layer during transfer of the layer to the stacking carriage or withdrawal of the stripping apron 28. Each side guide 42 comprises a mild steel plate reinforced by side plates 42" (FIG. 4) and carried on the shafts of three air cylinders 43 fixed to the sub-frame 17, the guide 42 being connected to the shafts 43' by means of blocks 43" (FIG. 5). The guides 42 can be moved towards and away from one another by operation of the air cylinders, to adjust the distance between them to cater for layers of loads of different overall widths. A pair of clamp members 80 extend along two sides of the stacking carriage at right angles to the guides 42, and at a level beneath the upper runs 32 and chains 30. The clamp members 80 can be moved towards one another by means of air cylinders 82, on which each clamp member is mounted in similar manner to the side guides 42, to close up the loads in a layer deposited by the apron 28. This is particularly useful, for example, with the loads are crates of the kind having side walls shaped to interlock with the side walls of adjacent crates.

Extending to a loading position beneath the stacking carriage 14 is a conveyor 44 on which an empty pallet 46 can be moved to a position at which a layer of loads can be deposited onto it, and on which the loaded pallet can be moved from the palletiser. Conveyor 44 can be a chain conveyor of conventional construction.

The transfer carriage 16 is mounted on the columns 12 in a similar manner to stacking carriage 14, and is similarly provided with an arrangement of drive motor 48 and lift chain 50 to effect vertical movement of the carriage. Mounted on the transfer carriage 16 is a transfer apron 52 formed by a slatted platform carried between two endless chains 54 in a manner similar to the stripping apron 28. The trailing slat 56 of the transfer apron 52 is raised so as to engage the side of a layer of loads supported on the apron 52 when it is in the upper horizontal run of the chains 54, so that when the transfer carriage is at the same level as the stacking carriage the layer of loads can be moved from the transfer apron 52 to the stripping apron 28 by driving the chains 54 (by means of a hydraulic motor mounted on the transfer carriage) and simultaneously driving chains 30 so that the stripping apron 28 is moved from the return run 34 to the upper horizontal run 32 of chains 30, the two aprons moving synchronously to ensure a smooth transfer. Transfer of the layer is also assisted by means of a power-driven transfer roller 58 at the end of the transfer carriage and an idler transfer roller 60 at the corresponding end of the stacking carriage. The transfer carriage is provided with side guides 62 similar to the side guides 42 of the stacking carriage.

An infeed chain conveyor 64 for crates to be palletised extends to a position near the columns 12 supporting the carriage, the conveyor being at a height of about 3 feet above floor level. Between the conveyor 64 and the palletiser is a half-load assembly table 68, on which loads can be assembled to form half of a layer. The assembly table 68 comprises a driven slat conveyor having a raised trailing slat, similar in construction to the transfer apron, so that a half-layer assembled on the table can be transferred to the transfer apron of the transfer carriage.

Figure 1:
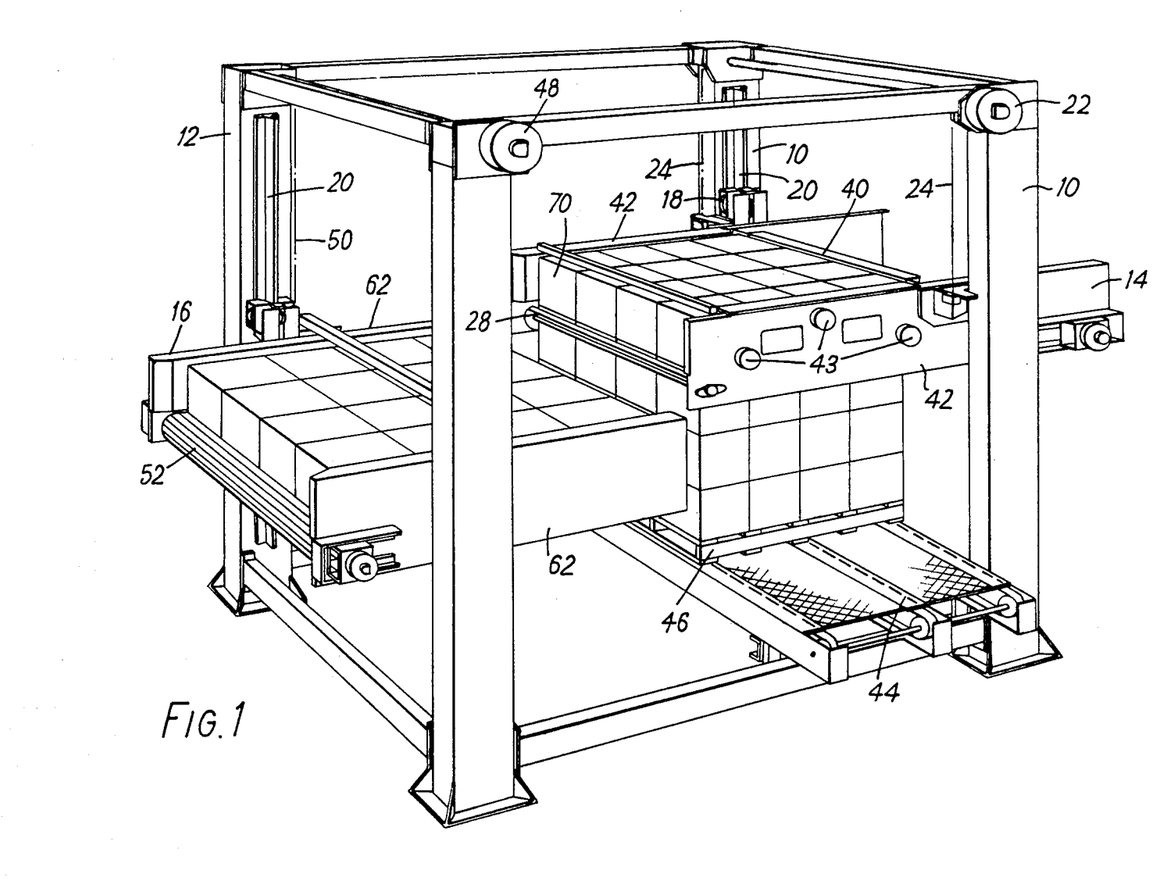
FIG. 1 is a perspective view of a palletiser in accordance with the invention.

In operation, an empty pallet 46 is moved on conveyor 44 to the loading position. The transfer carriage 16 is moved to the level of the assembly table 68, and two half-layers assembled on the table 68 are transferred in sequence to the transfer apron 52. The layer of loads is then transferred to the stripping apron 28, the stacking carriage having been moved to the level of the transfer carriage. The stacking carriage is then lowered till the stripping apron 28 is just above the level of the pallet, the sub-frame and the chains of the run 34 straddling the pallet, and the stripping apron is withdrawn to deposit the layer on the pallet. The stacking carriage is then moved back to the level of the transfer carriage to receive a further layer of loads to be deposited on top of the layer on the pallet. If the layer of loads deposited by the stacking carriage 14 is higher than the bottom of the carriage (i.e. with the second layer of loads 70 shown in FIG. 1), the carriage 16 must be raised above the layer to allow the stripping apron to move through the return run to the upper horizontal run of chains 30. The transfer carriage 16 is then raised, after receiving a layer of loads, till it is level with the stacking carriage to enable the layer to be transferred to the stacking carriage, and is subseqently lowered to the level of the assembly table 68 to receive the next layer of loads. The process is repeated until the desired number of layers has been stacked onto the pallet, the stacking carriage 14 is then raised to its uppermost position, above the top layer of loads, and the loaded pallet is discharged on the conveyor 44.

Since the transfer carriage and stacking carriage can move independently, the transfer carriage can begin its return travel to the level of the assembly table immediately after a layer of loads has been transferred to the stacking carriage, so that the process of depositing one layer and of assembling the next layer can be carried out at the same time, thus increasing the capacity of the apparatus.

It will be appreciated that operation of the palletiser could be made semi-automatic or fully automatic using suitable sensing devices. For example, sensors could be provided on the stacking carriage to sense the position of a pallet or the uppermost layer of loads on the pallet to enable movement of the carriage to be arrested at the appropriate positions, and similarly sensors could be provided on the transfer carriage to sense the stacking carriage to ensure that the transfer carriage is brought level with the stacking carriage before transfer of a layer of loads.

The described palletiser can also be operated as a de-palletiser, the stacking carriage 14 then acting to remove layers of load in sequence from a pallet and move them to the transfer carriage 16 from which they can be discharged at a low level to an unscrambling table taking the place of assembly table 68. The side guides 42 of the stacking carriage then act as gripping arms, the guides being moved towards one another to grip a layer of loads between them.

In operation of the apparatus as a de-palletiser, a loaded pallet 46 is moved on conveyor 44 to a position beneath the stacking carriage 14, the carriage 14 having been first raised to its uppermost position. The carriage 14 is lowered till the gripping arms formed by side guides 42 are disposed on opposite sides of the uppermost layer of loads 70 on the pallet, and the arms are moved together to grip that layer. The carriage 14 is raised, to lift the gripped layer and separate it from the layer beneath by a sufficient amount to enable the apron 28 to be moved to a position beneath the gripped layer. The gripping arms are moved apart to release the layer and deposit it on apron 28, and the platform is driven to transfer the layer to the apron 52 of transfer carriage 16, the carriage 16 having been first raised to the same level as carriage 14. The transfer carriage 16 is then lowered to the level of the unscrambling table 64 and the layer of loads discharged. At the same time the carriage 14 is lowered to grip and separate the next layer of loads, and the transfer carriage is then raised to the new level of the carriage 14 to receive that layer. The process is repeated until all the layers have been removed, the empty pallet being then discharged on conveyor 44 whilst the carriage 14 is moved to its uppermost position and the next loaded pallet is moved into position beneath the carriage.

It will be apparent that in operation as a depalletiser the apron 28 must be driven in the direction opposite to that in which it is driven when the apparatus operates as a palletiser, to effect transfer of each layer of loads from the apron to the transfer carriage 16. The apron may be provided with a raise slat to engage the layer and assist its movement onto the transfer carriage. Similarly, the apron 52 of the transfer carriage must be driven in the reverse direction to receive each layer of loads and subsequently to move it to the unscrambling table.

It will be appreciated that the invention, in addition to apparatus which can be used either for stacking or de-stacking, includes apparatus designed for operation solely as a de-stacker. For example, the apparatus shown in FIGS. 1 to 5 could be made solely for use as a palletiser. It would then not be necessary, for example, to construct the side guides 42 so that they can act as gripping members. Alternatively, the apparatus could be designed to operate solely as a de-palletiser. In that case the stripper plate 40 and the clamp members 80 could be omitted.

Figure 6:
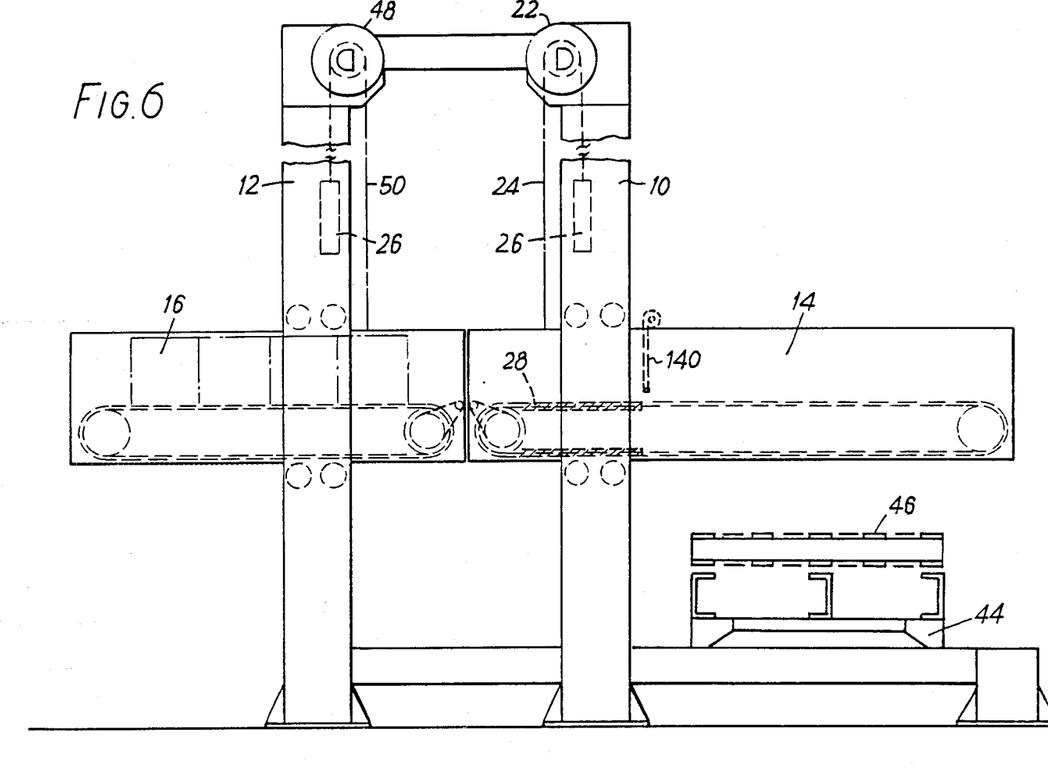
FIG. 6 is a diagrammatic side elevation of a modified form of the palletiser.

In the modification shown in FIG. 6, the supporting columns 10 are positioned closer to the columns 12 and the pallet conveyor 44 is positioned on the side of columns 10 remote from columns 12, near the outer end of the stacking carriage 14, the retracted position of the stripping apron 28 being at the inner end of the stacking carriage, as shown in FIG. 6. Instead of the fixed stripping plate 40 of the embodiment of FIGS. 1 to 5, the embodiment of FIG. 6 has a retractable stripping plate 140 which is hinged to the carriage 14 and movable between a raised position in which it is clear of loads being transferred from the platform of the transfer carriage to the stacking carriage and a lowered position in which it is vertical and located at the side of a layer of loads supported on the stripping apron. The stripping plate 40 can be moved by any suitable mechanism, for example by an air cylinder (not shown) acting between the frame of the stacking carriage and the stripping plate.

In operation of the embodiment of FIG. 6 as a palletiser, a layer of loads is received by the transfer carriage 16 and is then transferred to the stripping apron 28 of the stacking carriage 14, after the transfer carriage has been moved to the level of the stacking carriage, as in the embodiment of FIGS. 1 to 5. The stripping plate 140 is then moved to its lowered position and the stripping apron is moved to is retracted position, so that the layer of loads is deposited on the pallet or layer below. The stripping plate 140 is then raised so that the next layer of loads can be transferred to the stacking carriage. It will be apparent that the direction of movement of the stripping apron 28 during the stripping operation is opposite to that during transfer of a layer of loads from the transfer carriage and that the distance which the stripping apron has to move after the stripping operation to the position at which it can begin to receive the next layer of loads is reduced to a minimum. The time between each stripping operation and the next transfer operation is thus reduced, so that the overall speed of operation of the apparatus can be increased. The stripping plate 140 also acts, in its lowered position, as a guide for the loads, in in particular where the loads are tall, as they are deposited onto the pallet or layer below.

It will be appreciated that the embodiment of FIG. 6 could be modified, as with the embodiment of FIGS. 1 to 5, to act as a de-palletiser or as an apparatus operable selectively as a palletiser or de-palletiser.

It will be appreciated that many modifications could be made in both described embodiments. For example, the side guides or gripping arms 42 could be replaced by other mechanisms, e.g. by a movable arm or arms at one side of the carriage movable towards and away from a fixed arm or arms at the other side.

We claim:

1. Apparatus for stacking layers of loads, comprising a main frame, a stacking carriage and a transfer carriage each independently vertically movable on the main frame, the stacking carriage including a horizontally movable apron onto which a layer of loads can be transferred from the transfer carriage and which can be withdrawn from beneath the layer to deposit it at a loading position beneath the stacking carriage or onto a previously deposited layer of loads, first drive means for effecting vertical movement of the stacking carriage whereby the carriage can be raised after depositing one layer of loads to a position in which the apron can be returned to receive a further layer of loads, second drive means for effecting vertical movement of the transfer carriage whereby the transfer carriage can be raised from a lowered position in which a layer of loads can be loaded onto the transfer carriage to the level of the stacking carriage, and transfer means for transferring a layer of loads from the transfer carriage to the stacking carriage, said transfer means comprising a flexible platform movable in a closed path including a horizontal run in which the platform can support a layer of loads and a return run, and means for driving the platform so that platform moves to transfer a layer of loads to the stacking carriage, the platform of the stacking carriage moving synchronously with movement of the apron of the transfer carriage to receive the layer of loads.

2. Apparatus as claimed in claim 1, and in the form of a palletiser, there being provided means for moving a pallet to the loading position to receive the first layer of loads deposited by the stacking carriage, and means for discharging a loaded pallet from the apparatus.

3. Apparatus as claimed in claim 1, in which the apron of the stacking carriage comprises a flexible platform supported between a pair of driven endless chains spaced apart by a distance greater than the width of the layers to be stacked and having a horizontal run in which the platform is horizontal and can support a layer of loads transferred from the transfer carriage, and a vertical stripper plate is fixed to the stacking carriage immediately above the said horizontal run so as to engage a layer of loads on the platform and hold the layer stationary as the chains are driven to withdraw the platform from beneath the layer, the chains and platform being arranged so that when the platform has been completely withdrawn from the layer it occupies a position which does not impede the depositing of the layer onto the layer or pallet beneath.

4. Apparatus as claimed in claim 3, in which the platform comprises a series of parallel slats supported between the chains.

5. Apparatus as claimed in claim 1, in which the platform of the stacking carriage is adapted to move during a stripping operation in the same direction as it moves during the transfer operation, the stripper plate being located so that after the layer has been transferred to the stacking carriage the stripper plate is at the side of the layer remote from the transfer carriage.

6. Apparatus as claimed in claim 1, in which the platform of the stacking carriage is adapted to move during a stripping operation in the direction opposite to that in which it moves during the transfer operation, the stripper plate being located so that after the layer has been transferred to the stacking carriage the stripper plate is at the side of the layer nearest to the transfer carriage, the stripper plate being retractable to a position in which it is clear of the path of a layer of loads during transfer from the transfer carriage to the stacking carriage.

7. Apparatus for stacking layers of loads, comprising a main frame, a stacking carriage and a transfer carriage each independently vertically movable on the main frame, the stacking carriage including a horizontally movable apron onto which a layer of loads can be transferred from the transfer carriage and which can be withdrawn from beneath the layer to deposit it at a loading position beneath the stacking carriage or onto a previously deposited layer of loads, first drive means for effecting vertical movement of the stacking carriage whereby the carriage can be raised after depositing one layer of loads to a position in which the apron can be returned to receive a further layer of loads, second drive means for effecting vertical movement of the transfer carriage whereby the transfer carriage can be raised from a lowered position in which a layer of loads can be loaded onto the transfer carriage to the level of the stacking carriage, and means for transferring a layer of loads from the transfer carriage to the stacking carriage, in which the apparatus is operable selectively as a stacking apparatus or a de-stacking apparatus, there being provided on the stacking carriage gripping means adapted to grip the uppermost layer of loads in a stack so that the layer can be separated vertically from the layer beneath by an amount sufficient to allow the said apron to be moved beneath the separated layer and subsequently transfer it to the transfer carriage.

8. Apparatus as claimed in claim 7, in which the gripping means comprises at least two gripping arms positioned so as to extend along opposite sides of and above the level of the apron when it is in position to support a layer of loads, and means for moving at least one of the arms towards the other so that the arms can grip a layer of loads between them and for moving at least the said one of the arms away from the other to release the layer, the arms acting as side guides during transfer of a layer of loads to the transfer carriage and during transfer of a layer from the transfer carriage to the apron when the apparatus is used for stacking.

9. Apparatus as claimed in claim 8, in which the means for moving the gripping arms comprises a plurality of piston and cylinder devices supporting at least the said one of the arms.

10. Apparatus as claimed in claim 7 and operable selectively as a palletiser or de-palletiser, the apparatus further including means for moving a pallet to a position beneath the stacking carriage in which layers of loads can be stacked on or removed from the pallet, and means for discharging the pallet from the said position.

11. Apparatus for removing layers of loads from a stack, for example of loads stacked in layers on a pallet, the apparatus comprising a main frame, a load-supporting carriage and a transfer carriage each independently vertically movable on the main frame, the load-supporting carriage having gripping means adapted to grip the uppermost layer of loads in the stack so that the layer can be separated vertically from the layer beneath or from a pallet, means for transferring a layer of loads thus gripped to transfer carriage, first drive means for effecting vertical movement of the load-supporting carriage whereby the carriage can be lowered after one layer of loads has been transferred to the transfer carriage to enable the next layer of loads to be gripped, and second drive means for effecting vertical movement of the transfer carriage whereby the transfer carriage can be raised to a position to receive a layer of loads gripped by the load-supporting carriage and subsequently lowered to a position at which the layer of loads can be discharged from the transfer carriage, in which the means for transferring each layer of loads from the load-supporting carriage to the transfer carriage comprises a flexible platform mounted on the load-supporting carriage and supported between a pair of driven endless chains spaced apart by a distance greater than the overall width of the layers to be removed and having a horizontal run in which the platform is horizontal and positioned beneath the gripping means so that it can support the layer of loads on release of the gripping means, and means for driving the chains to cause the platform to be moved beneath a layer of loads gripped by the gripping means and separated vertically from the layer beneath or from a pallet and to move further after the layer has been released by the gripping means to transfer the layer to the transfer carriage.

* * * * *